(12) United States Patent
Denbratt

(10) Patent No.: US 6,536,407 B1
(45) Date of Patent: Mar. 25, 2003

(54) METHOD OF CONTROLLING THE PROCESS OF COMBUSTION IN AN INTERNAL COMBUSTION ENGINE, AND ENGINE WITH MEANS FOR CONTROLLING THE ENGINE VALVES

(75) Inventor: Ingemar Denbratt, Kullavik (SE)

(73) Assignee: AB Volvo, Gothenburg (SE)

( * ) Notice: Subject to any disclaimer, the term of this patent is extended or adjusted under 35 U.S.C. 154(b) by 0 days.

(21) Appl. No.: 09/830,316

(22) PCT Filed: Oct. 26, 1999

(86) PCT No.: PCT/SE99/01928

§ 371 (c)(1),
(2), (4) Date: Jul. 31, 2001

(87) PCT Pub. No.: WO00/28197

PCT Pub. Date: May 18, 2000

(30) Foreign Application Priority Data

Oct. 26, 1998 (SE) .............................................. 9803667

(51) Int. Cl.$^7$ ........................... F02B 75/02; F02B 47/08
(52) U.S. Cl. ................................... 123/311; 123/568.14
(58) Field of Search ............................ 123/311, 568.14

(56) References Cited

U.S. PATENT DOCUMENTS 4,768,481 A 9/1988 Wood 6,257,213 B1 * 7/2001 Maeda ................... 123/568.14
6,286,482 B1 * 9/2001 Flynn et al. .................. 123/435

FOREIGN PATENT DOCUMENTS

| EP | 0 367 553 | 5/1990 |
| EP | 0 879 955 | 11/1998 |
| JP | WO98/32961 | * 7/1998 ............ 123/568.14 |
| WO | WO 98/10179 | 3/1998 |

* cited by examiner

Primary Examiner—Noah P. Kamen
(74) Attorney, Agent, or Firm—Young & Thompson

(57) ABSTRACT

Four-stroke internal combustion engine with electrically operated inlet and exhaust valves (9,11) and means for supplying a homogeneous fuel/air mixture to the engine cylinders (1). The valves are controlled by a control unit (15), which, within a lower rpm range, closes the exhaust valve (11) before the piston (4) has reached its upper dead center point. Under the effect of trapped residual gas, a temperature increase is achieved, which results in compression ignition of the fuel/air mixture. The control unit (15) controls the exhaust valve (11), so that the amount of residual gases in the cylinders at the closing of the exhaust valves is greater at low loads and high rpm than at high loads and low rpm, in order to control the ignition delay in this manner.

12 Claims, 2 Drawing Sheets

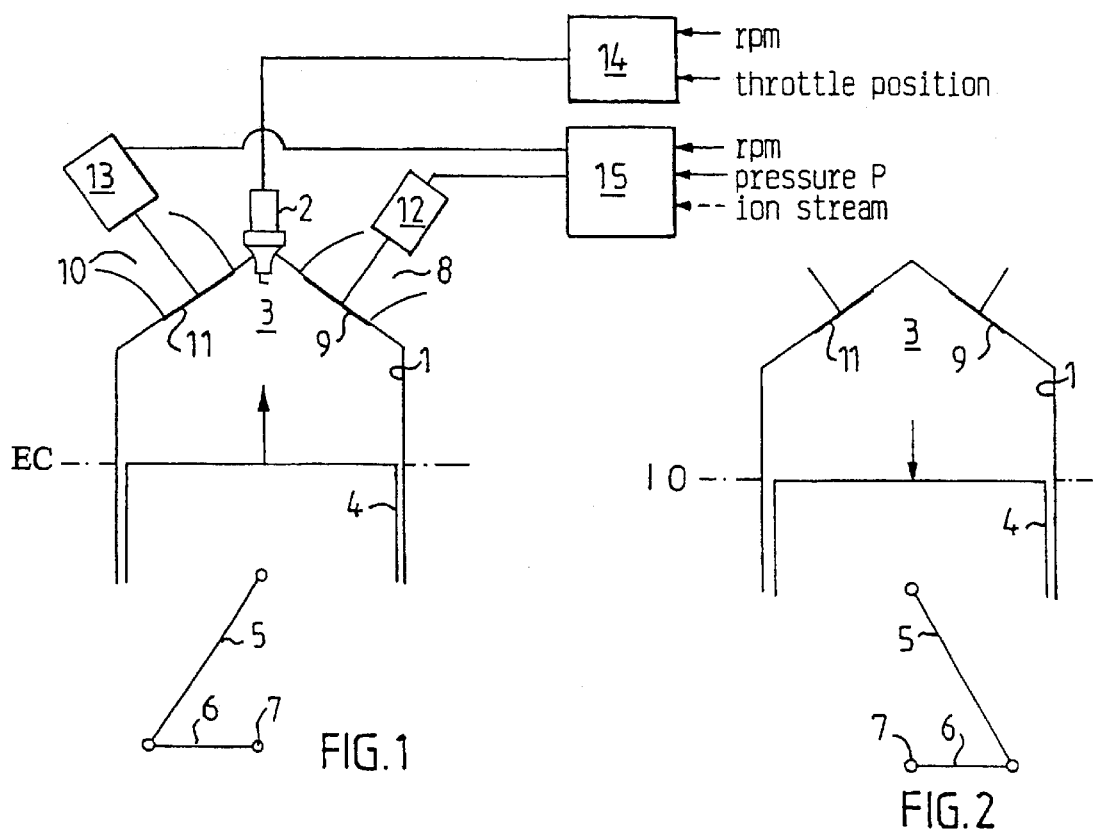
FIG.1
FIG.2
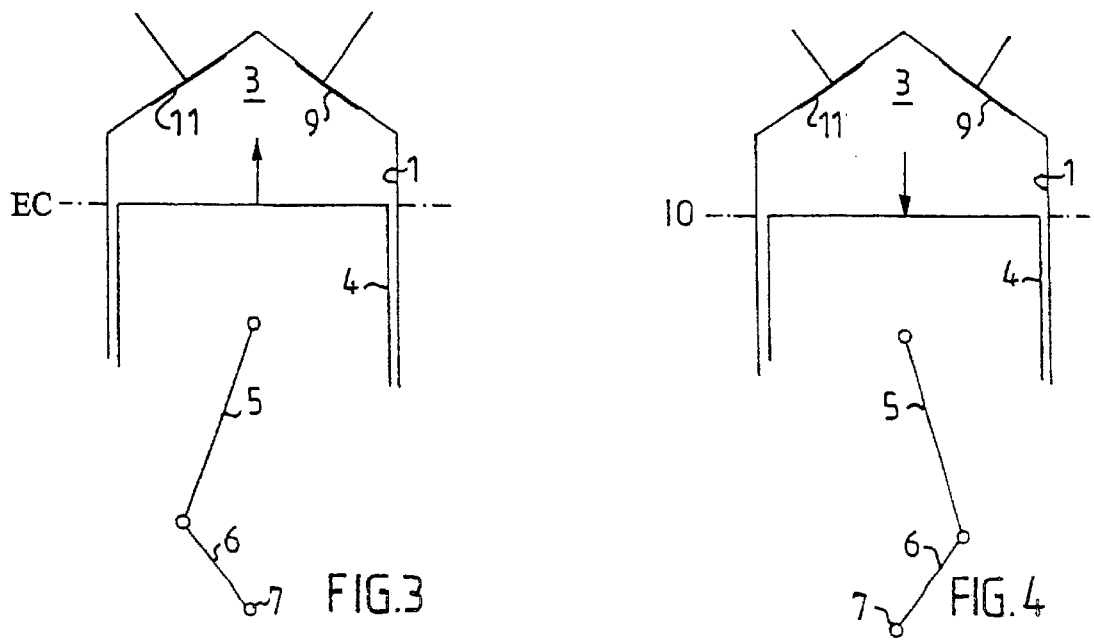
FIG.3
FIG.4

METHOD OF CONTROLLING THE PROCESS OF COMBUSTION IN AN INTERNAL COMBUSTION ENGINE, AND ENGINE WITH MEANS FOR CONTROLLING THE ENGINE VALVES

BACKGROUND OF THE INVENTION

The present invention relates to a method of controlling the combustion process in the combustion chamber in a four-stroke internal combustion engine with at least one cylinder having at least one inlet valve and at least one exhaust valve, comprising supply of a homogeneous fuel/air mixture to the combustion chamber and compression of the mixture to self-ignition.

The invention also relates to a four-stroke internal combustion engine with at least one cylinder having at least one inlet valve and one exhaust valve, means for supplying a homogeneous fuel/air mixture to the cylinder combustion chamber and control means for at least varying the degree of opening of the exhaust valve.

In compression ignition of a homogeneous fuel/air mixture, so-called HCCI (Homogeneous Charge Compression Ignition) in a four-stroke internal combustion engine, a homogeneous diluted (with extra air or residual gas) fuel/air mixture is compressed to self-ignition. The advantage of this compared to first compressing the inlet air and then injecting fuel into the combustion chamber (the diesel process) is that the entire fuel/air mixture burns simultaneously and not successively as when a flame front propagates through the combustion chamber from a sparkplug or injector. This creates a homogeneous temperature in the combustion chamber, which in turn makes it possible to achieve, for example in an unthrottled Otto-engine at partial load, the efficiency of the diesel engine but without the high nitrogen oxide and particle emissions of the diesel engine. The nitrogen emissions can be reduced from ca. 1000 ppm to as little as 10–20 ppm. The particle emissions of the diesel engine can be reduced to the same level as those of the Otto-engine. The difficulty is, however, to control the combustion since it is kinetically controlled. If the mixture is too rich, the energy released will be too rapid (knocking), and if it is too lean, ignition will be made impossible. In an HCCI Otto-engine with gasoline as fuel, a high and controlled temperature is required to achieve self-ignition, and this can be achieved with high compression ratio and/or by heating the inlet air. In an HCCI diesel engine with diesel oil as fuel, lower temperatures are required than with a normal diesel engine, which means that the compression ratio must be lowered.

The difficulty up to now in HCCI engines has been to control the ignition delay (the cylinder temperature) in such a manner that the combustion is positioned correctly about the top dead center at various rpms and loads, and this has greatly reduced the range of use of such engines. Especially, control problems during transients, where the cylinder temperature must be checked from one cycle to the next, have limited the range of use of HCCI engines to generators, for example, where the drive unit operates with very small variations in rpm and load.

SUMMARY OF THE INVENTION

The purpose of the present invention is to achieve a method of controlling the temperature in the cylinders in an HCCI engine, so that the ignition time will be correct at various engine speeds and loads, thereby making it practically possible to use HCCI engines in motor vehicles, thereby reducing their fuel consumption and emissions.

This is achieved according to the invention by virtue of the fact that the exhaust valve during the exhaust stroke of the piston is controlled so that it, at least within a lower rpm range, closes before the piston has reached its upper dead center point, the degree of opening of the valve being varied, depending on engine load and rpm so that the amount of residual gas at closing of the valve is greater at low loads and high rpm than at high loads and low rpm, to thereby vary the ignition delay by varying the degree of dilution of the fuel/air mixture with residual gases in the combustion chamber.

Complete freedom of valve control, so that the opening and closing times can also be freely controlled from cycle to cycle, can be achieved by using electromagnetically operated valves. The amount of residual gases which determine the temperature in the combustion chamber and thus the ignition time, can be regulated in this manner within a broad interval, within which the temperature increases the earlier the exhaust valve is closed.

In order to prevent increase in engine pump work (pump losses), according to a further development of the method according to the invention, the inlet valve is so controlled during the inlet stroke of the piston, that, at least within said lower rpm range, it opens a certain number of crankshaft degrees after the upper dead center point of the piston, the degree of opening being varied relative to the degree of opening of the exhaust valve, to reduce residual gas pressure in the combustion chamber to the inlet air pressure.

An HCCI engine which must be able to operate within a wide rpm range, e.g. with an upper limit of about 6000 rpm, is preferably equipped with an ignition system which is controlled so that it is deactivated within said lower rpm range, the upper limit of which can lie between 3000 and 4000 rpm. When this limit is exceeded, the ignition system is activated at the same time as the control of the exhaust and inlet valves is changed to normal engine operation, i.e. the exhaust valve is controlled so that it closes after the piston, during the exhaust stroke, has reached its upper dead center, at the same time as the inlet valve is controlled so that it begins to open before the exhaust valve is completely closed. The same applies at high load and low rpm, since otherwise the rate of combustion will be too high as the degree of dilution is reduced.

An internal combustion engine of the type described by way of introduction, which is to be controlled in the above described manner, is characterized in that the control means are so arranged to control the exhaust valve during the exhaust stroke of the piston, that the valve, at least within a lower rpm range, closes before the piston has reached its upper dead center point, and that the degree of opening of the valve is varied, depending on the engine load and rpm, so that the amount of residual gases in the combustion chamber at the closing of the valve is greater at lower loads and higher rpm than at higher loads and lower rpm.

BRIEF DESCRIPTION OF THE DRAWINGS

The method according to the invention will be described below with reference to the accompanying drawings, where FIGS. 1–4 show schematically a cylinder with associated piston in a four-stroke internal combustion engine.

DETAILED DESCRIPTION OF THE PREFERRED EMBODIMENTS

Figure 5:
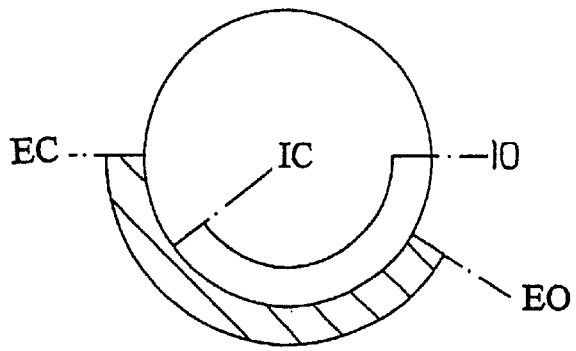
FIGS. 5–7 show various valve control diagrams.

In FIG. 1, 1 designates a cylinder in the engine block of a four-stroke internal combustion engine, which in the example shown is an Otto-engine, having a sparkplug 2 projecting into the combustion chamber 3. The cylinder 1 has a piston 4, which is connected via a connecting rod 5 to a throw 6 on the crankshaft 7. The combustion chamber 3 has an inlet 8 for supply of fuel/air mixture. An inlet valve 9 is arranged in the inlet port of the combustion chamber. An exhaust valve 11 is arranged in an outlet port 10 to the exhaust conduit.

The opening and closing of the inlet and exhaust valves 9 and 11 are electromagnetically controlled with the aid of electromagnetic devices 12 and 13, respectively. The valves can be of a type which is known per se with a valve spindle, joined to a metal disc located between two electromagnets. The electromagnets are magnetized alternatingly and the metal disc is drawn towards that magnet which is momentarily magnetized. With electromagnetically controlled valves of this known type, the degree of opening of the valves can be freely controlled, both from cycle to cycle and for individual cylinders. The sparkplug 2 is joined to an ignition system 14 with a control unit, into which, e.g., signals representing engine rpm and accelerator pedal position are fed for controlling the ignition as a function of engine rpm and load. The electromagnets of the valves 9, 11 are controlled by a control unit 15, into which there is fed a signal from a sensor (now shown), which directly or indirectly measures the pressure P in the cylinder chamber, and/or a signal representing the ion flow. This signal can be obtained with the sparkplug as a sensor.

Figure 6:
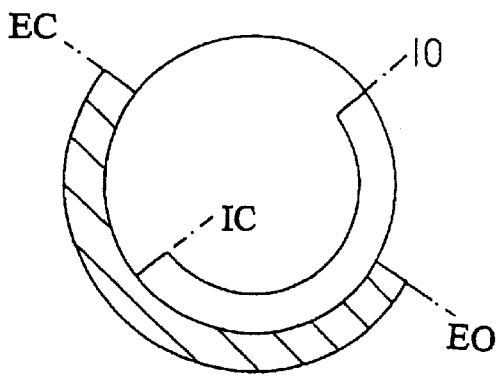
Figure 7:
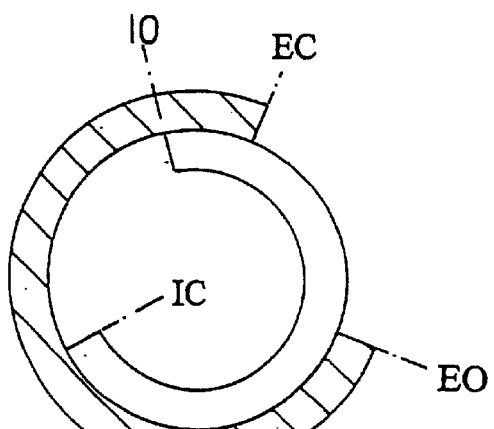

FIGS. 1–4 show HCCI operation, i.e. the ignition system is deactivated and ignition of the fuel/air mixture supplied to the combustion chamber 3 is effected by self-ignition during compression of the mixture. FIG. 1 illustrates the position EC of the plunger when the exhaust valve 11 closes during the exhaust stroke, at low load and high rpm within the low rpm range, i.e. up to ca. 3000–4000), while FIG. 2 shows the position IO of the piston when the inlet valve 9 opens during the inlet stroke under the same operating conditions. FIGS. 3 and 4 show in a corresponding manner the piston position EC and IO at higher load and lower rpm. In FIGS. 5–7, EO designates exhaust open, EC exhaust closed, IO inlet open and IC inlet closed. FIG. 5 shows the valve times at low load and high rpm while FIG. 6 shows the corresponding times at high load and low rpm. At a given load, rpm and ratio between air and fuel in the fuel/air mixture, a shorter ignition delay (earlier ignition start) is obtained the earlier the exhaust valve closes, because the amount of trapped hot residual gases will in this case increase in the combustion chamber. By feeding back the ion stream signal or the pressure sensor signal, the opening and closing of the valve can be regulated so that the combustion can be correctly positioned during HCCI operation within the entire lower rpm range.

When the rpm exceeds the upper limit of the lower rpm range, e.g. ca. 4000 rpm for a passenger car with a top end rpm of ca. 6000–8000 rpm, the valve control is switched to normal Otto-engine operation, i.e. with said valve overlap, as shown in FIG. 7, at the same time as the ignition system is activated. The same is true when the engine load exceeds 50–70% of the maximum engine load.

The degree of opening of the valves can in principle be regulated in two manners for controlling the amount of residual gas during the exhaust stroke or during the pressure reduction during the inlet stroke. Either the length of stroke of the valves can be constant and the times for closing the exhaust valve and opening the inlet valve can be varied, as illustrated in FIGS. 1–4, or the length of stroke of the valves can be varied and the opening time can be constant or they can be controlled with a combination of the two methods.

With an Otto-engine in HCCI operation, an efficiency can be obtained corresponding to that of a normal diesel engine, but without the particle emissions of the diesel engine. Even a diesel engine can be run in HCCI operation with corresponding control of the valves. Double fuel injectors are required in this case, however, viz. firstly, injectors for injecting fuel into the inlet tube for HCCI operation within a lower rpm range, and, secondly, injectors for direct injection at normal diesel operation within the rpm range thereover. Furthermore, devices are required for switching the fuel injection.

Variable valve control can also be obtained with other means than electromagnets.

What is claimed is:

1. Method of controlling the combustion process in the combustion chamber (3) of a four-stroke internal combustion engine with at least one cylinder (1) having at least one inlet valve (9) and one exhaust valve (11), comprising supply of a homogeneous fuel/air mixture to the combustion chamber, and compression of the mixture to self-ignition, characterized in that the exhaust valve (11) during the exhaust stroke of the piston (4) is controlled so that it, at least within a lower rpm range, closes before the piston has reached its upper dead center point, the degree of opening of the valve being varied, depending on engine load and rpm so that the amount of residual gas at closing of the valve is greater at low loads and high rpm than at high loads and low rpm, to thereby vary the ignition delay by varying the degree of dilution of the fuel/air mixture with residual gases in the combustion chamber.

2. Method according to claim 1, characterized in that the inlet valve (9), during the inlet stroke of the piston (4), is controlled so that it, at least within said rpm range, opens a certain number of crankshaft degrees after the upper dead center point of the piston, the opening angle being varied in relation to the opening angle of the exhaust valve (11), to reduce the residual gas pressure in the combustion chamber (3) to the inlet pipe air pressure.

3. Method according to claim 1 for controlling the combustion process in an internal combustion engine with means (2) for spark ignition of the fuel/air mixture in the combustion chamber (3), characterized in that the spark ignition means (2) are kept deactivated within said lower rpm range and are activated when the engine rpm exceeds the upper limit of the lower rpm range, and that the exhaust valve (11) within the upper rpm range is controlled so that it closes after the piston (4), during the exhaust stroke, has reached its upper dead center point.

4. Method according to claim 2, characterized in that the exhaust valve (11) and the inlet valve (9) are controlled so that the inlet valve begins to open before the exhaust valve has completely closed.

5. Method according to claim 1, characterized in that electromagnets (12,13) are used to control the valves (9,11).

6. Method according to claim 1, characterized in that gasoline is used as fuel.

7. Four-stroke internal combustion engine with at least one cylinder (1) having at least one inlet valve (9) and one exhaust valve (11), means for supplying a homogeneous fuel/air mixture to the combustion chamber (3) of the cylinder, and control means (15) for at least varying the degree of opening of the exhaust valve (11), characterized in that the control means (15) are so arranged to control the exhaust valve (11) during the exhaust stroke of the piston (4), that the valve, at least within a lower rpm range, closes before the piston has reached its upper dead center point, and that the degree of opening of the valve is varied, depending on the engine load and rpm, so that the amount of residual gases in the combustion chamber at the closing of the valve is greater at low loads and higher rpm than at high loads and lower rpm, to thereby vary the ignition delay by varying the degree of dilution of the fuel/air mixture with residual gases in the combustion chamber.

8. Engine according to claim 7, characterized in that the control means (15) are so arranged to control the inlet valve (9) during the inlet stroke of the piston (4), that the valve, at least within said lower rpm range, opens first after a certain number of crankshaft degrees after the upper dead center point of the piston, and that the opening angle is varied in relation to the opening angle of the exhaust valve, to reduce the residual gas pressure in the combustion chamber to the inlet air pressure.

9. Engine according to claim 7, characterized in that the valves (9,11) have electromagnetic means (12,13), which are connected to a control unit (15), which controls the valve operating means in response to various signals fed into the control unit.

10. Engine according to claim 9, characterized in that the control unit (15) is connected to an ion stream signal sensor arranged in the combustion chamber (3), a tachometer and a pressure sensor.

11. Engine according to claim 9, characterized in that the control unit (15) is connected to a pressure signal transducer.

12. Engine according to claim 7 with an ignition system comprising at least one sparkplug (2) for each cylinder (1) and an ignition control device (14), which is connected to a tachometer and to an accelerator pedal position sensor, characterized in that the ignition control device (14) is disposed to keep the sparkplug (2) deactivated within said lower rpm range and to activate the sparkplug when the engine speed exceeds the upper limit of the lower rpm range, and that the control unit (15) of the valves (9,11) is disposed to control the valves within the upper rpm range, so that the inlet valve (9) begins to open before the exhaust valve (11) has completely closed.

* * * * *